(12) United States Patent  
Stich et al.

(10) Patent No.: US 8,572,601 B2
(45) Date of Patent: *Oct. 29, 2013

(54) SYSTEM AND METHOD FOR AUTOMATIC INSTALLATION AND MAINTENANCE OF HARDWARE AND SOFTWARE IN A DISTRIBUTED COMPUTER SYSTEM

(75) Inventors: Christian M. Stich, Hirschberg a. d. Bergstrasse (DE); Marcel Dix, Mannheim (DE); Peter Johan Walther Schemat, Västeras (SE)

(73) Assignee: ABB Research Ltd., Zürich (CH)

( * ) Notice: Subject to any disclaimer, the term of this patent is extended or adjusted under 35 U.S.C. 154(b) by 1417 days.

This patent is subject to a terminal disclaimer.

(21) Appl. No.: 11/882,116

(22) Filed: Jul. 30, 2007

(65) Prior Publication Data

US 2008/0028396 A1 Jan. 31, 2008

(30) Foreign Application Priority Data

Jul. 31, 2006 (DE) .......................... 10 2006 035 889

(51) Int. Cl.
*G06F 9/44* (2006.01)

(52) U.S. Cl.
USPC ............................ 717/174; 717/168; 717/177

(58) Field of Classification Search
USPC ................................................ 717/168–178
See application file for complete search history.

(56) References Cited

U.S. PATENT DOCUMENTS

| 5,870,611 | A | * | 2/1999 | London Shrader et al. ... | 717/175 |
| 6,009,274 | A | * | 12/1999 | Fletcher et al. ............... | 717/173 |
| 7,275,048 | B2 | * | 9/2007 | Bigus et al. ..................... | 706/46 |
| 2002/0194584 | A1 | * | 12/2002 | Suorsa et al. .................. | 717/176 |
| 2003/0035005 | A1 | | 2/2003 | Kodosky et al. | |
| 2003/0066065 | A1 | * | 4/2003 | Larkin .......................... | 717/177 |
| 2004/0060045 | A1 | * | 3/2004 | Hind et al. .................... | 717/174 |
| 2005/0066019 | A1 | * | 3/2005 | Egan et al. .................... | 709/223 |

OTHER PUBLICATIONS

Augerat et al., A scalable file distribution and operating system installation toolkit for clusters, 2002—Citeseer, pp. 1-7.*
Evans, E.; Rogers, D.; , "Using Java applets and CORBA for multi-user distributed applications," Internet Computing, IEEE , vol. 1, No. 3, pp. 43-55, May/Jun. 1997.*
White et al., A unified architecture for automatic software updates, 2004, http://www.cs.ru.ac.za/research/g00w1690/files/issa2004.pdf, pp. 1-11.*
German Search Report.

* cited by examiner

*Primary Examiner* — Wei Zhen
*Assistant Examiner* — Satish Rampuria
(74) *Attorney, Agent, or Firm* — Buchanan Ingersoll & Rooney PC

(57) ABSTRACT

The invention relates to a system and a method for automatic installation and maintenance of hardware and/or software in the system nodes (SK) of a distributed computer system, in particular in a distributed automation system, comprising a system installation and/or system maintenance tool (WZ), wherein the system installation and/or system maintenance tool (WZ) can be activated from a single arbitrary access in the distributed system. The system installation and/or system maintenance tool (WZ) selects a software package and/or a functional component, and automatically executes the maintenance steps of the selected software package and/or of the selected functional component as regards the distribution, installation and/or configuration of the software package and/or of the selected functional component in a defined sequence on the system nodes (SK) of the distributed system.

18 Claims, 2 Drawing Sheets

SYSTEM AND METHOD FOR AUTOMATIC INSTALLATION AND MAINTENANCE OF HARDWARE AND SOFTWARE IN A DISTRIBUTED COMPUTER SYSTEM

RELATED APPLICATION

This application claims priority under 35 U.S.C. §119 to German Patent Application No. 10 2006 035 889.9 filed in Germany on Jul. 31, 2006, the entire content of which is hereby incorporated by reference in its entirety.

FIELD

The invention relates to a system and a method for automatic installation and maintenance of hardware and/or software in the system nodes of a distributed computer system, in particular in a distributed automation system.

BACKGROUND

Distributed computer systems, in particular process control systems, are composed of a multiplicity of distributed components that are interrelated, for example in client-server relationships. The components of the distributed system, each of which provide one or more functionalities, are distributed over a plurality of computers or data processing devices, also referred to below as system nodes. Examples of system nodes used in the automation system are operator stations, engineering stations, archiving stations, control equipment comprising processing stations, and input and output units. The system nodes are connected together via one or more physical networks.

Operating systems, user software, control programs and various functional components of the process control system are installed on the system nodes, with the individual system nodes, including their various functional components, being dependent on each other in a variety of ways.

There are a range of software tools for installing and maintaining hardware and/or software in a distributed automation system, some of which assist in the maintenance tasks to be carried out and which, for example, install new systems, system updates, system upgrades to a higher version and system expansions incorporating additional functionalities, or which perform system analyses. These processes, however, do not include functionalities distributed over a plurality of system nodes. The aforementioned separate software tools are, by way of example, tools for backing up and restoring application data, tools for the system analysis or tools for upgrading the firmware in controllers, the tools being addressed and started in different ways. This means that the tools are nonuniform in their operator control and are not necessarily in tune with one another. The use of the tools for the relevant maintenance tasks, particularly as regards their order and the time of their use within the manual maintenance process, is usually described in documentation which the user needs to read beforehand, resulting in increased risk of error.

The current approach to software installation and maintenance assumes that computers are functionally self-contained. For installation and maintenance tasks on distributed systems, such as, for example, system updates, system upgrades, system expansions or system analyses, it is usually necessary to execute different installation and configuration steps separately in a specific, predefined sequence on every system node. At present, there is no tool that manages such installation and maintenance tasks on a system-wide basis from a single computer.

In addition, existing procedures only handle individual computers in a distributed system independently of each other.

Further disadvantages of today's system installation procedures and system maintenance procedures relate to the fact that in order to install and maintain the new software, the user must interact with every desktop, and must often cover large distances between the individual computers, for example by means of a remote maintenance console.

SUMMARY

The object of the invention is hence to define a system for automatic installation and maintenance of hardware and/or software in the system nodes of a distributed system, in particular in a distributed automation system, whereby the aforementioned disadvantages are avoided and system installation and system maintenance in the system nodes can be performed in a particular defined sequence on each system node in an automated manner.

This object is achieved according to the invention by a system having the features given in Claim 1. Advantageous embodiments, improvements of the system according to the invention and a corresponding method for automatic installation and maintenance of the hardware and software in a distributed system are specified in further claims and in the description.

According to the invention, the system for automatic installation and maintenance of hardware and software in the system nodes of a distributed system comprises a system installation and/or system maintenance tool that can be activated from a single arbitrarily selectable access in the distributed system.

The system installation and/or system maintenance tool can be activated firstly by any system node in the distributed system or secondly using a maintenance console connected to the distributed system, the maintenance console being connected to the distributed system by means of an Internet connection, for example.

The system installation and/or system maintenance tool selects a maintenance activity, in particular a software package and/or a functionality. The selected functionality is, for example, a set of operating station functions or the interfacing of a controller in a process control system.

The selectable software packages are elements of life cycle management activities such as new system installations, system updates, system upgrades to a higher version, system expansions incorporating additional functionalities or system analyses.

The system installation and/or system maintenance tool automatically executes the relevant maintenance steps of the selected maintenance activity from a single starting point in a particular defined sequence on the various system nodes of the distributed system. The maintenance steps include, in particular, the distribution, installation and configuration of the selected software packages.

To this end, the system installation and/or system maintenance tool has a uniform inherently tuned environment for performing the various maintenance activities.

If the system installation and/or system maintenance tool is being executed for the first time and if the system has not yet been installed, the tool first of all provides an option for reinstalling the system. Following the reinstallation of the system, provision is made for the same tool to be able to be used to select further options for maintaining the system, such as a search for new updates and automatic provision and installation thereof or else an extension of the existing system by further functions which have not yet been installed.

In addition, the system installation and/or system maintenance tool automatically recognizes upon starting whether a system is already installed or how it is configured, for example by checking the installed functionality. The system installation and/or system maintenance tool then always provides the user with the appropriate life cycle management activities which are able to be installed at this time. It is thus possible to address all relevant life cycle management activities with this tool using a single entry point.

The various life cycle management activities provided by the system installation and/or system maintenance tool for performance are described by various predefined processes which include the necessary installation and configuration steps needing to be carried out on the various computers in the distributed system. When a life cycle management activity is selected for the distributed system, the system installation and/or system maintenance tool performs the appropriate process therefor. For each process for the different life cycle management activities, the tool always presents the user with a standard user interface in the form of a man-machine interface, with the individual masks of the interface reproducing the various process steps to be performed. Although the individual lifecycle management processes may be very different according to their task, the handling and appearance of the tool is thus of uniform design.

In an advantageous embodiment of the system according to the invention, the system installation and/or system maintenance tool comprises a display module, which stores the changes in the distributed system that have been produced by the software packages and/or functional components or applications newly installed and/or configured by the system installation and/or system maintenance tool, displays these changes and/or provides them for further processing, for example for output on a printer.

The display module is additionally provided also for documenting changes to the network structure, for instance produced by adding, removing or replacing operator stations, engineering stations, archiving computers, control equipment comprising processing stations, input and output units and communications interfaces, and/or changes to the individual hardware components such as replacement of graphics cards or hard disks.

In a further advantageous embodiment of the system according to the invention, a test module is provided, which tests that the installation and configuration of the distributed software packages and/or functional components are fully implemented on the individual system nodes, and/or creates a system status report. In addition, it is provided that the test module also tests the interdependencies of the software packages and/or functional components between the system nodes as regards the existence of the necessary dependent components in the distributed system.

The inventive system advantageously allows the maintenance steps and the observance of the correct order of the maintenance steps on the respective system nodes to be performed by a single arbitrarily selectable system node using a software tool in the distributed system.

A further advantage of the system according to the invention is that after the automatic installation and/or configuration of the software packages and functional components in the entire distributed system, the system is immediately operational again.

The method also used to achieve the object is described in Claim 13. In this method, a system installation and/or system maintenance tool is activated from an arbitrarily selectable system node of the distributed system.

A maintenance activity, in particular a software package and/or a functionality, is selected from an arbitrarily selectable access in the distributed system using a system installation and/or system maintenance tool. The selected software package and/or the selected functional component are automatically distributed, installed and/or configured in a defined sequence on the system nodes.

In an advantageous embodiment of the invention, the installation and configuration of the selected and distributed software packages and/or functional components are automatically tested and evaluated to assess whether they are operational, and/or a status report on the entire distributed system is created, said activities being performed by a test module.

In addition to automatic installation and configuration of the software and hardware on the entire distributed system without additional external interventions from a single starting point, the method according to the invention can also be used to uninstall existing software.

It is further provided that in redundant distributed systems, the method according to the invention is used to perform an automatic installation and maintenance of the hardware and/or software in the system nodes of one of the redundant system parts even during their operation, with guaranteed functionality of the entire system being maintained.

The system and method according to the invention are preferably employed in a distributed automation system, where the system nodes include, for example, operator stations, engineering stations, archiving stations, control equipment comprising processing stations, input and output units and/or communications interfaces.

The invention and advantageous embodiments and improvements of the invention shall be explained and described in more detail with reference to the exemplary embodiment shown in FIGS. 1 and 2, in which:

DETAILED DESCRIPTION

Figure 1:
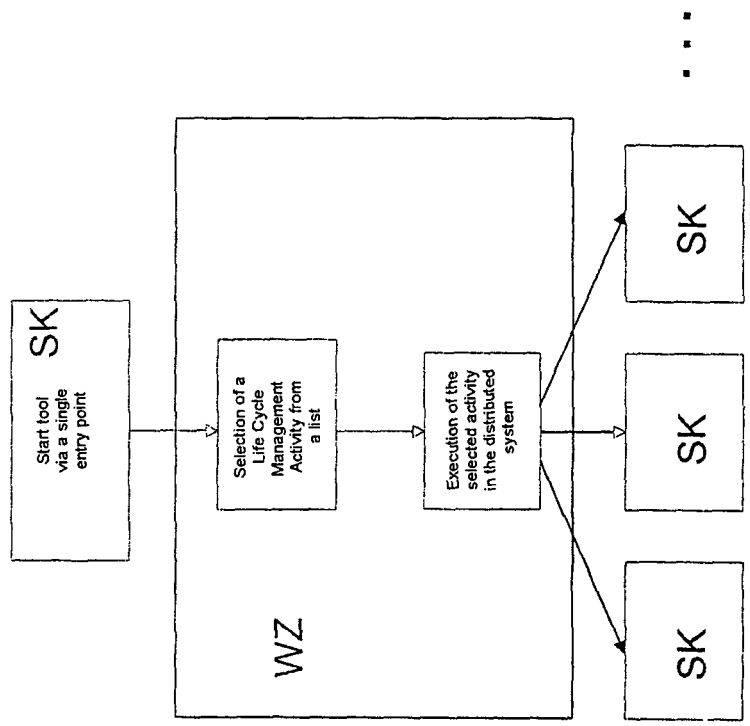
FIG. 1 shows an embodiment of the system according to the invention for automatic installation and maintenance of hardware and/or software in the system nodes of a distributed automation system.

FIG. 1 shows an embodiment of the system according to the invention for automatic installation and maintenance of hardware and/or software in the system nodes SK of a distributed automation system, implemented as a process control system, over its entire life cycle, where various functional components such as an operating system or user software are stored in the system nodes SK. The individual system nodes SK including their various functional components are dependent on each other in a variety of ways.

According to the invention, the system for automatic installation and maintenance of hardware and software in the system nodes SK of the process control system comprises a system installation and/or system maintenance tool WZ that can be activated from a single arbitrarily selectable system node SK of the process control system.

In one particular embodiment of the inventive system, the system installation and/or system maintenance tool WZ uses an Internet connection to perform upgrades to the software in the system nodes SK of the distributed system.

The system installation and/or system maintenance tool WZ automatically selects a life cycle management activity LCMA from an available set of predefined life cycle management activities LCMA.

For this purpose, the various life cycle management activities LCMA are represented by different predefined processes in the system installation and/or system maintenance tool WZ. The processes describe the necessary installation and configuration steps, which are to be performed in a specific sequence on specific system nodes SK of the process control system.

The system installation and/or system maintenance tool WZ automatically executes the necessary steps for distribution, installation and configuration of the life cycle management activity LCMA in a defined sequence on the various system nodes SK of the process control system. The distribution of the selected life cycle management activity LCMA and execution of the relevant installation and configuration steps can be started and controlled from any computer or system node SK of the process control system.

Since the installation and configuration steps are to be executed on a plurality of different system nodes SK, the system installation and/or system maintenance tool WZ controls the process for the system-wide execution of the predefined processes on the various system nodes SK of the process control system.

If a specific process step within the process is to be performed on a different system node SK, the system installation and/or system maintenance tool WZ activates this system node SK to execute the process step or executes the relevant process step itself on the remote system node SK.

The process described above thus ensures across the system that the installation and configuration steps are performed in the correct sequence on the various computers, where the system installation and/or system maintenance tool WZ can be activated from a single starting point or access in the distributed system.

Figure 2:
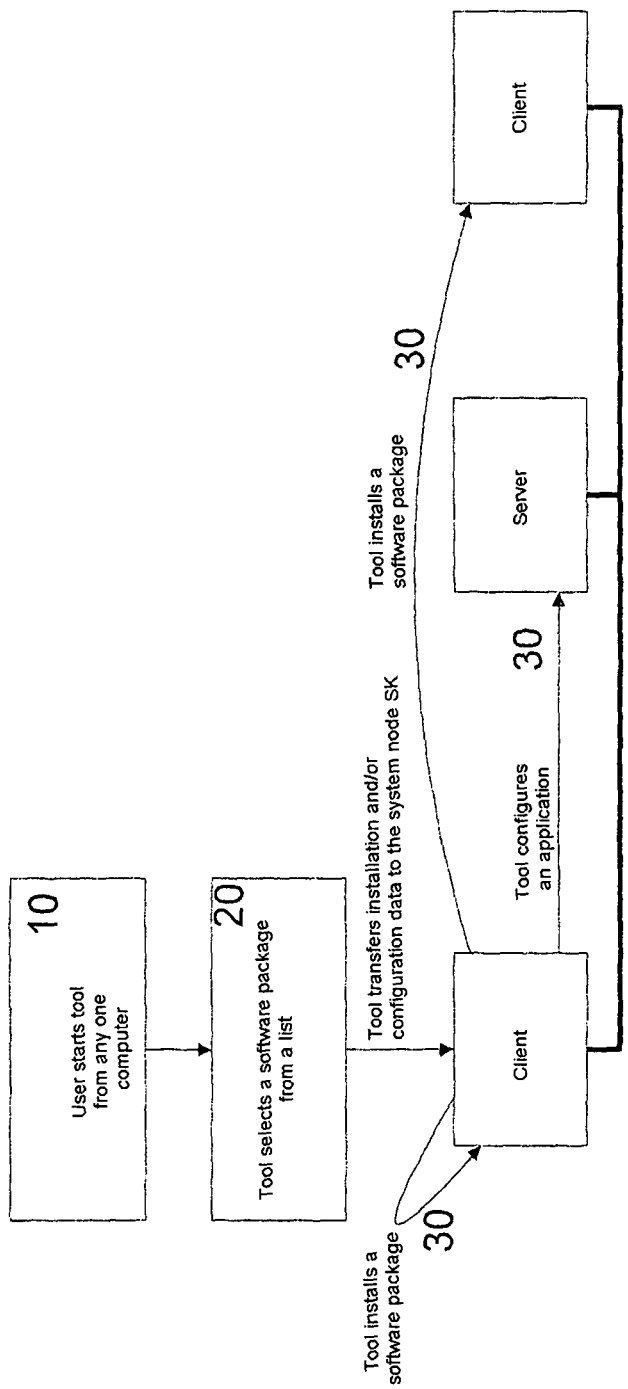
FIG. 2 shows an example of a method procedure for automatic installation and maintenance of hardware and/or software in the system nodes of a distributed automation system.

FIG. 2 shows an example of a method procedure for automatic installation and maintenance of software in the data-processing devices SK of a distributed automation system.

The method according to the invention specifies a number of steps by which the automatic installation and maintenance of the software in the system nodes SK of the distributed automation system are executed.

In a first step 10, the system installation and/or system maintenance tool WZ is started from single arbitrary system node SK of the distributed automation system.

After the system installation and/or system maintenance tool WZ is started, a life cycle management activity LCMA is automatically selected from an available set of predefined life cycle management activities LCMA in a second step 20.

The selected life cycle management activity LCMA is automatically executed in a third step 30 on the system nodes SK of the automation system in the correct sequence according to a predefined process of the respective life cycle management activity LCMA, where the individual process steps for distribution, installation and configuration depend on the life cycle management activity LCMA to be executed at that time.

The invention claimed is:

1. A system for automatic installation and maintenance of hardware and software in a plurality of system nodes (SK) of a distributed computer system comprising:
   memory for storing a system maintenance tool;
   a processor at each of the plurality of system nodes,
   wherein the processor at each of plurality of system nodes is configured to:
      activate the system maintenance tool (WZ) at the respective system node among the plurality of system nodes in the distributed system,
      select a software package and/or a functional component from among a plurality of software packages and/or functional components via the activated system maintenance tool (WZ),
      execute automatically, the maintenance steps of the selected software package and of the selected functional component for at least one of a distribution, installation and configuration of the software package and of the selected functional component in a defined sequence on the plurality of system nodes (SK) of the distributed system via the activated system maintenance tool (WZ), and
   wherein the selected software packages are elements of life cycle management activities (LCMA) which include new system installations, system updates, system upgrades to a higher version, system expansions incorporating additional functionalities or system analyses; wherein the life cycle management activities (LCMA) are represented by different predefined processes in the system maintenance tool (WZ), and the processes describe the installation and configuration steps, which are to be performed in a specific sequence on the system nodes (SK) of the distributed system.

2. The system according to claim 1, wherein the system maintenance tool (WZ) controls the process for the system-wide execution of the predefined processes on the system nodes (SK) in the process control system.

3. The system according to claim 1, wherein the one system node activating the system maintenance tool (WZ) is selected from any of the plurality of system nodes (SK) in the distributed system or wherein the one system node is a maintenance console connected to the distributed system.

4. The system according to claim 1, wherein the processor at each of the plurality of system nodes is configured to use an Internet connection to perform upgrades to the software in other system nodes (SK) of the distributed system via the system maintenance tool (WZ).

5. The system according to claim 1, wherein the processor at each of the plurality of system nodes is configured to interact with a display module, which stores the changes in the distributed system that have been produced by the software packages and functional components newly installed and configured, displays these changes and/or provides them for further processing via the system maintenance tool (WZ).

6. The system according to claim 1, wherein the processor at each of the plurality of system nodes is configured to document changes to the network structure and to the individual hardware components.

7. The system according to claim 1, wherein the plurality of system nodes (SK) are data-processing devices includes at least one of operator stations, engineering stations, archiving stations, control equipment comprising processing stations, input and output units and communications interfaces.

8. The system according to claim 1, wherein a test module is provided, which tests that the installation and configuration of the distributed software packages and functional components are fully implemented on the plurality of system nodes (SK) of the distributed system, and tests the interdependencies of the software packages and functional components between the system nodes (SK) of the distributed system, and creates a system status report.

9. The system according to claim 1, wherein after the automatic installation and configuration of the software packages and functional components, the distributed system is immediately operational again.

10. The system according to claim 1, wherein the processor at each of the plurality of system nodes is configured to provide an option for reinstalling the system and, following reinstallation of the system selecting further options for maintaining the system via the system maintenance tool (WZ).

11. The method according to claim 10, comprising:
documenting, in the system maintenance tool (WZ) changes to the hardware, which includes adding, removing or replacing system nodes (SK) or hardware components.

12. A method for automatic installation and maintenance of hardware and software in a plurality of system nodes (SK) of a distributed computer system, each node being configured to execute the method comprising:
activating a system maintenance tool (WZ) at the respective system node among the plurality of system nodes in the distributed system,
selecting, at the respective system node, a software package and a functional component using the system maintenance tool (WZ) from among a plurality of software packages and/or functional components,
executing, from the respective system node, maintenance steps of the selected software package and of the selected functional component in a defined sequence on other system nodes (SK) of the distributed system, wherein the maintenance steps include distributing, installing, and/or configuring the software package and the selected functional component, and
wherein life cycle management activities (LCMA) include executing new system installations, system updates, system upgrades to a higher version, system expansions incorporating additional functionalities or system analyses by the selected software packages; wherein the life cycle management activities (LCMA) to be performed in a specific sequence on the plurality of system nodes (SK) of the distributed system are represented by different predefined processes, and the processes are described installation and configuration steps.

13. The method according to claim 12, wherein the process for the system-wide execution of the predefined processes on the various system nodes (SK) in the process control system are controlled during an installation or maintenance sequence by one of the plurality of system nodes activating the system installation and/or system maintenance tool (WZ).

14. The method according to claim 12, wherein the system maintenance tool (WZ) is activated by any one of the plurality of system nodes (SK) in the distributed system or by a maintenance console connected to the distributed system.

15. The method according to claim 12, comprising: performing upgrades to software in other nodes of the plurality of system nodes (SK) of the distributed system via an Internet connection via the system maintenance tool (WZ).

16. The method according to claim 12, wherein at the one system node the system maintenance tool (WZ) is connected to a display module, which stores, displays and provides for further processing, changes in the distributed system.

17. The method according to claim 12, wherein a test module performs activities comprising at least one of:
testing the installation and configuration of the distributed software packages and functional components to assess whether they are fully implemented and operational on each of the plurality of system nodes; and
creating a system status report is created.

18. The method according to claim 12, comprising: providing an option for reinstalling the system and, following the reinstallation of the system, selecting further options for maintaining the system via the system maintenance tool (WZ).

* * * * *